United States Patent [19]

Maeda et al.

[11] Patent Number: 4,553,019
[45] Date of Patent: Nov. 12, 1985

[54] GOUGING WIRE ELECTRODE

[75] Inventors: Masanori Maeda, Higashiosaka; Koji Ishihara, Hirakata; Tetsuo Ikebata, Katano, all of Japan

[73] Assignee: Matsushita Electric Industrial Co., Ltd., Kadoma, Japan

[21] Appl. No.: 599,438
[22] PCT Filed: Aug. 10, 1983
[86] PCT No.: PCT/JP83/00258
  § 371 Date: Apr. 6, 1984
  § 102(e) Date: Apr. 6, 1984
[87] PCT Pub. No.: WO84/00724
  PCT Pub. Date: Mar. 1, 1984

[30] Foreign Application Priority Data

Aug. 12, 1982 [JP] Japan .............................. 57-140604

[51] Int. Cl.⁴ ........................................... B23K 35/368
[52] U.S. Cl. ............................. 219/146.22; 219/69 W; 219/146.31
[58] Field of Search ............ 219/69 W, 146.1, 146.22, 219/146.31, 146.51

[56] References Cited

U.S. PATENT DOCUMENTS 2,818,352 12/1957 Ludwig et al. ............... 219/146.1 X
3,345,495 10/1967 Quaas et al. ...................... 219/74 X Primary Examiner—Roy N. Envall, Jr.
Assistant Examiner—Catherine Sigda
Attorney, Agent, or Firm—Wenderoth, Lind & Ponack

[57] ABSTRACT

A gouging wire electrode comprising a metal shell, and a powdery or particulate filler section packed into the metal shell, the composition of the filler section comprising 80–95% by weight of carbon and 5–20% by weight of thermosetting resin binder, the bulk density of the filler section being 1.2–1.7 g/cm³ and the cross-sectional area of the filler section being 60–90% of the total cross-sectional area. It produces stabilized arcs during electric discharge and is consumed slowly and can replace the conventional carbon electrode.

1 Claim, 4 Drawing Figures

GOUGING WIRE ELECTRODE

TECHNICAL FIELD

The present invention relates to a gouging wire electrode used for grooving workpiece metal by producing an electric arc between an electrode rod and the workpiece metal to heat and melt part of the workpiece metal, and blowing compressed air against the part to blow off molten metal.

BACKGROUND ART

Gouging electrode rods heretofore used are formed by sintering carbon to provide a length of rod and plating the rod surface with copper or flame-spraying the rod surface with aluminum. Since such electrode rods are limited in length, continuous gouging operation requires frequent exchange and hence the efficiency is low. Further, shortened electrode rods account for a loss of about 15%. On the other hand, various types of connectable carbon electrode rods have been proposed, but they have drawbacks that connection takes time and that the gouged groove configuration varies at the connection.

Thus, various types of wirelike electrode rods intended to eliminate these drawbacks have been devised.

Among the conventional gouging wires, a typical one is in the form of a filler section serving as an electrode material wrapped in a shell which is a hoop of metal such as iron or stainless steel. As for the composition of said filler section, usually it consists mainly of carbon with suitable amounts of binder and stabilizing agent added thereto.

This type of gouging wire electrode, as compared with the aforesaid gouging carbon electrode rod, has the following drawbacks.

(1) The stability of arcs during discharge is poor. That is, since arcs can hardly be produced continuously, it is impossible to obtain a uniform gouged groove.

(2) Since the rod is consumed so rapidly that it can hardly be treated by hand, requiring an automatic machine. Further, it is comparatively high in cost.

DISCLOSURE OF INVENTION

A gouging wire electrode according to the present invention comprises a metal shell, and a powdery or particulate filler section consisting mainly of carbon and packed into said metal shell, said filler being composed of 80–95% by weight of carbon and 5–20% by weight of thermosetting resin binder, said filler has a bulk density of 1.2–1.7 g/cm$^3$ and a cross-sectional area which is 60–90% of the total cross-sectional area of the wire.

To said filler, there may be added an arc stabilizing agent, as needed, within the range of not more than 10% by weight.

According to this arrangement, there is obtained an economical gouging wire electrode which produces stabilized arcs during discharge and is consumed slowly, as in the case of the carbon electrode rod.

BEST MODE OF CARRYING OUT THE INVENTION

Figure 1:
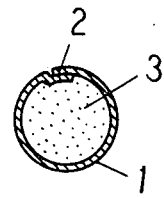
FIG. 1 is a cross-sectional view showing a structural example of a gouging wire electrode.
Figure 2:
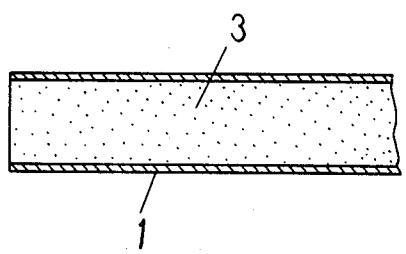
FIG. 2 is a longitudinal section thereof.

FIGS. 1 and 2 show a structural example of a gouging wire electrode. The numeral 1 denotes a metal shell obtained by forming a metal hoop of long strip into a pipe, and 2 denotes the overlap portion of the hoop. The numeral 3 denotes a powdery or particulate filler section wrapped in the shell 1 in the step of forming the hoop into a pipe.

The metal shell 1 is made usually of iron or stainless steel. The filler section 3 is composed of a mixture of carbon and thermosetting resin binder, with an arc stabilizing agent added thereto, if necessary.

The composition, bulk density, and cross-sectional area ratio of the filler section will now be described in detail.

(A) Composition

If the carbon content is 100%, i.e., there is no binder contained, the carbon powder or particles are scattered during electric discharge, the arcs become discontinuous, making it impossible to provide a satisfactory gouged groove and increasing the rate of consumption of the electrode to the extent of making the electrode impractical. If a suitable amount of thermosetting resin binder is incorporated, it is cured by arc heat during discharge and thereby holds the carbon and prevents the latter from flying around, so that the arcs are stabilized and the consumption rate is decreased.

Figure 3:
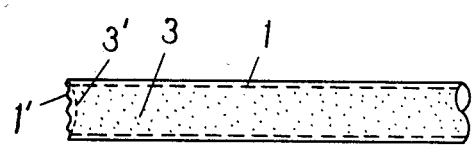
FIG. 3 is an external view of a wire whose binder content of the filler section is zero, said view taken after the wire is discharged.

FIG. 3 is an external view of a post-discharge wire containing no thermosetting resin binder, showing that a scattering of carbon resulted in a receded front end 3' of the filler portion as compared with the molten front portion 1' of the metal shell. In this state, arc is not continuous and the rate of consumption is high.

Figure 4:
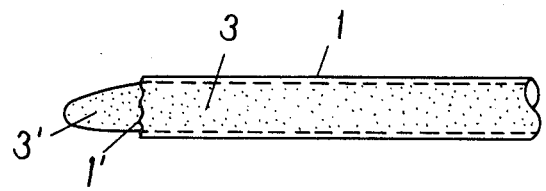
FIG. 4 is an external view of a wire according to the present invention, taken after it is discharged.

FIG. 4 is an external view of a wire having 10% by weight of thermosetting resin binder incorporated therein, the view being taken after the wire is discharged, showing that since the cured binder binds the carbon, the front end 3" of the filler section protrudes in front of the front end molten portion 1' of the metal shell 1. This state approximates the state obtained when a conventional gouging carbon electrode rod is discharged, providing a stabilized arc and reduced rate of consumption.

When the amount of thermosetting resin is 5% by weight or less, almost no effect can be obtained and when it is 20% by weight or more, no improvement of performance can be seen, giving off odor and smoke during discharge and decreasing the carbon by the corresponding amount, thus producing reverse effects such as an increased rate of consumption of the wire electrode. Examples of suitable thermosetting resins are phenol resin and xylene resin. These may be in powder or liquid form. Which form should be selected depends on the production steps.

If an arc stabilizing agent is to be incorporated, its amount should be 10% by weight or less. The reason is that it is hardly required in the case of electric discharge being effected using a dc power source and a very small amount is effective where an ac power source is used but even if an amount of more than 10% by weight is incorporated, the effect reaches its limit, the cost increases, and the consumption rate increases by the corresponding amount. In addition, as for arc stabilizing agents, known ones such as oxides and salts of rare earth elements are used.

(B) Bulk Density

The composition of the filler has been described so far, but improvements in composition alone are not sufficient to provide a product which compares with the gouging carbon electrode rod. Concerning the filler section, it has been found that in addition to the above, the bulk density of the filler itself is very important. The range is suitably between 1.2 and 1.7 g/cm³.

The carbon section of the conventional gouging electrode rod is formed by sintering, as described above, and its bulk density is generally 1.6 g/cm³ or more. If the bulk density of the filler section of the gouging wire electrode is 1.2 g/cm³ or less, the consumption rate is high and the arcs tend to be discontinuous, so that a uniformly gouged groove cannot be obtained. That is, it has been found that if performance and economic features corresponding to those of the gouging carbon electrode rod are to be obtained, the bulk density of the filler section should be 1.2 g/cm³ or more.

The method of increasing the bulk density of the filler section of the gouging wire electrode may be by once wrapping the filler in the metal shell and passing the assembly through a die to squeeze the wire diameter, but excessive squeezing would result in the shell being damaged or broken; thus there is a limit to it. As a result of various investigations, it has been found that it is necessary to increase the bulk density of the filler before it is wrapped in the shell. If the bulk density of the filler prior to wrapping is 0.7 g/cm³ or more, a product in which the bulk density of the filler is 1.2 g/cm³ or more can be obtained by simply passing the material to squeeze the outer diameter within the range which does not break the wire. The object of giving a bulk density of 0.7 g/cm³ or more to the filler prior to wrapping can be attained by using a composition comprising 50% by weight of coarse, e.g., 20–300 mesh, graphite powder, 30% by weight of fine, e.g., not more than 300 mesh, graphite powder, 10% by weight of carbon black, and 10% by weight of binder.

It has been found, however, that if the density of the filler section is 1.7 g/cm³ or more, this causes the phenomenon of arcs becoming discontinuous. The reason is that with the density as high as 1.7 g/cm³ or more, the filler section no longer exists in powder or particulate form and instead it takes the form of a solid bar similar to a carbon rod, so that when the wire is wound, the filler section breaks at intervals of some mm to some cm inside the metal shell. That is, the filler section becomes discontinuous at places where it has broken, and the arcs are interrupted at these places. Further, at that time the filler section chips off and the consumption rate is increased. Therefore, the optimum bulk density of the filler section is 1.2–1.7 g/cm³.

(C) Cross-Section Area Ratio

The composition and bulk density of the filler section have been described so far, but in the final step of production of gouging wires, the relation between the metal shell and its cross sectional area is important. That is, from the results of our many experiments, we have come to the conclusion that the cross-sectional area of the filler section should be 60–90% of the total cross-sectional area of the wire or, in other words, the cross-sectional area of the metal shell should be 10–40% of the total cross-sectional area of the wire. For example, if the outer diameter of the wire is 4 mm, the thickness of the metal shell should be 0.1–0.45 mm. If the thickness of the metal shell is less than the values in this range, the filler cannot be properly wrapped and spills through the overlap region of the metal shell, and the wire tends to break when it is squeezed by a die. Further, it cannot withstand the working current and becomes red hot and molten and the consumption rate is increased; thus, it cannot be put to practical use. Reversely, if the metal shell is thick, it is difficult to squeeze the wire and to increase the bulk density of the filler. And since the amount of the filler naturally becomes decreased, the wire is consumed sooner and arcs are produced between the metal shell, and the workpiece and the gouged groove becomes ununiform, taking a wavy form. Further, the groove width is decreased, so that it is not practical.

As has so far been described in detail, the gouging wire electrode of the present invention is characterized in that the filler composition comprises 80–95% by weight of carbon and 5–20% by weight of thermosetting binder, the bulk density of the filler section is 1.2–1.7 g/cm³, and the cross-sectional area of the filler section is 60–90% of the total cross-sectional area of the wire.

Tables 1–3 show results of experiments. The wires used were 4 mm in outer diameter and an automatic gouging device was used with a dc power source, the current being about 180 A and the voltage being about 40 V. The grooves obtained were about 6.5 mm wide and about 3.5 mm deep.

Table 1 shows the relation between the filler composition and performance, the bulk density being 1.5 g/cm³ and the cross-sectional area being 75% of the wire cross-sectional area.

Table 2 shows the relation between filler bulk density and performance. The filler composition comprised 90% by weight of carbon and 10% by weight of binder, the cross-sectional area of the filler section being 75% of the wire cross-sectional area.

Table 3 shows the relation between the ratio of the cross-sectional area of the filler section to the wire cross-sectional area and performance. In this case, the composition of the filler section comprised 90% by weight of carbon and 10% by weight of binder, the bulk density being 1.5 g/cm³.

TABLE 1

| Composition of filler section (% by weight) | | Performance evaluation | | | |
| --- | --- | --- | --- | --- | --- |
| Carbon content | Binder content | Arc stability | Consumption characteristic | Evolution of odor and smoke | Overall evaluation |
| 75 | 25 | ◉ | X | Large | X |
| 80 | 20 | ◉ | Δ | Rather large | ◉ |
| 90 | 10 | ◉ | ◉ | Little | ◉ |
| 95 | 5 | Δ | ◉ | None | ◉ |
| 100 | 0 | X | X | None | X |

◉ = very good
○ = good
Δ = rather poor
X = poor

TABLE 2

| Bulk density (g/cm³) | Arc stability | Consumption characteristic | Overall evaluation |
| --- | --- | --- | --- |
| 1.1 | Δ | X | X |
| 1.2 | ◉ | Δ | ◉ |
| 1.5 | ◉ | ◉ | ◉ |

TABLE 2-continued

| Bulk density (g/cm$^3$) | Arc stability | Consumption characteristic | Overall evaluation |
|---|---|---|---|
| 1.7 | Δ | ◎ | ◎ |
| 1.8 | X | Δ | X |

TABLE 3

| Cross-sectional area ratio of filler section (%) | Arc stability | Consumption characteristic | Overall evaluation |
|---|---|---|---|
| 55 | X | Δ | X |
| 60 | Δ | ◎ | ◎ |
| 75 | ◎ | ◎ | ◎ |
| 90 | ◎ | Δ | ◎ |
| 95 | Δ | X | X |

INDUSTRIAL APPLICABILITY

In the gouging wire electrode of the present invention, since the arcs during electric discharge are stabilized, constant grooving can be performed at all times, and since it is slowly consumed, it is economical. Therefore, it can supersede the conventional carbon electrode rod. Further, it may be used in combination with an automatic machine to make continuous operation possible.

What is claimed is:

1. A gouging wire electrode comprising a metal shell, and a powdery or particulate filler packed into said metal shell, the composition of said filler section comprises 80–95% by weight of carbon and 5–20% by weight of thermosetting resin binder, the bulk density of the filler being 1.2–1.7 g/cm$^3$ and the cross-sectional area of the filler being 60–90% of the total cross-sectional area.

* * * * *